US008040607B2

(12) United States Patent
Miller (10) Patent No.: US 8,040,607 B2
(45) Date of Patent: Oct. 18, 2011

(54) SURFACE-RELIEF DIFFRACTION GRATING (75) Inventor: John Michael Miller, Gatineau (CA)

(73) Assignee: JDS Uniphase Corporation, Milpitas, CA (US)

( * ) Notice: Subject to any disclaimer, the term of this patent is extended or adjusted under 35 U.S.C. 154(b) by 238 days.

(21) Appl. No.: 12/419,365

(22) Filed: Apr. 7, 2009

(65) Prior Publication Data

US 2009/0268295 A1   Oct. 29, 2009

Related U.S. Application Data (60) Provisional application No. 61/047,799, filed on Apr. 25, 2008.

(51) Int. Cl.
*G02B 5/18* (2006.01)
(52) U.S. Cl. ........................................ 359/576; 359/569
(58) Field of Classification Search .................. 359/569, 359/576, 566, 571; 356/328
See application file for complete search history.

(56) References Cited

U.S. PATENT DOCUMENTS

| 5,471,344 | A | * | 11/1995 | Sugawara | 359/566 |
| 5,907,436 | A | | 5/1999 | Perry et al. | 359/576 |
| 7,019,904 | B2 | | 3/2006 | Shiozaki et al. | 359/569 |
| 7,142,363 | B2 | * | 11/2006 | Sato et al. | 359/569 |
| 7,184,214 | B2 | | 2/2007 | Shiozaki et al. | 359/569 |
| 7,688,512 | B2 | * | 3/2010 | Kittaka et al. | 359/576 |

OTHER PUBLICATIONS

M. Shiozaki et al., "Novel Design of Polarization Independent Multilayer Diffraction Grating With High Angular Dispersion", SEI Technical Review, No. 59, pp. 27-31, Jan. 2005.

* cited by examiner

*Primary Examiner* — Audrey Y Chang
(74) *Attorney, Agent, or Firm* — Teitelbaum & MacLean; Neil Teitelbaum; Doug MacLean (57) ABSTRACT A bilayer transmission diffraction grating having antireflection lines having rectangular cross-section over grating lines having trapezoidal cross-section is described. The process-dependent grating line profile is accounted for by characterizing the grating line profile and performing electromagnetic wave diffraction simulations, whereby a grating duty cycle is selected that results in an improvement of overall diffraction efficiency and/or reducing polarization dependent loss of a diffraction grating having the characterized grating line profile. Grooves in the substrate between the grating lines further improve diffraction efficiency and reduce polarization dependent loss. The entire grating line profile, including the antireflection line, the grating line, and the groove in the substrate between the grating lines, can be defined using a single etch mask, which reduces process and equipment related manufacturing costs.

20 Claims, 8 Drawing Sheets

FIG. 1

*Prior Art*

SURFACE-RELIEF DIFFRACTION GRATING

CROSS-REFERENCE TO RELATED APPLICATIONS

The present invention claims priority from U.S. provisional patent application No. 61/047,799, filed Apr. 25, 2008, which is incorporated herein by reference.

TECHNICAL FIELD

The present invention relates to diffraction gratings, and in particular to surface-relief transmission diffraction gratings and methods of selection of grating parameters such as grating duty cycle.

BACKGROUND OF THE INVENTION

A diffraction grating is a collection of reflecting or transmitting elements separated by a distance comparable to a wavelength of light. It may be thought of as a collection of diffracting elements, such as a pattern of transparent slits or apertures in an opaque screen, or a collection of reflecting grooves on a substrate. A reflection diffraction grating consists of reflecting grating elements disposed on a surface, whereas a transmission diffraction grating consists of transmitting grating elements disposed on a transparent surface or within a transparent slab of material. Light incident on a diffraction grating will diffract and, upon diffraction, will have an electric field amplitude or phase, or both, modified in a predictable manner, so that light at different wavelengths will propagate at different directions. This wavelength separating property of a diffraction grating is used to build spectrometers, wavelength selective optical switches, ultrashort laser pulse compressors, and other wavelength-selective optical devices.

In optical devices based on transmission diffraction gratings, the optical paths of incident and diffracted light are separated. This allows for a greater freedom in positioning of optical elements used in redirecting and collimating the incident and the diffracted light beams. Today's transmission diffraction gratings are usually free of absorptive materials such as metals, which reduces light absorption and makes the gratings usable in high-power laser applications. Furthermore, modern transmission diffraction gratings can be made entirely out of inorganic materials. Lack of organic materials results in improved environmental stability and reliability of the gratings. High environmental stability is particularly important in wavelength-selective optical switch applications of the gratings. Most of the transmission gratings based on inorganic materials are surface-relief gratings, in which the transmitting grating elements are transparent grating lines or grooves running parallel to each other on a grating surface. In a high-efficiency transmission diffraction grating, the grating lines or grooves modify only the optical phase distribution of an incoming light wave, whereby high diffraction efficiency becomes achievable. Herein, the term "diffraction efficiency" is defined as a proportion of the optical power of the diffracted light in the optical power of the incoming light.

A high-efficiency surface-relief transmission diffraction grating can be obtained by etching a groove pattern in a transparent overlayer on a glass or fused silica substrate, or in the substrate itself. For example, U.S. Pat. No. 5,907,436 by Perry et al. discloses a transmission diffraction grating obtained by etching a binary groove pattern in a top layer of a multilayer dielectric stack deposited on a transparent substrate. Further, U.S. Pat. No. 7,142,363 by Sato et al. teaches a transmission diffraction grating obtained by etching a trapezoidal groove pattern in a bilayer dielectric stack deposited on a transparent substrate. Both diffraction gratings of Perry and Sato provide a high diffraction efficiency at an oblique angle of incidence, the grating period being smaller than the wavelength of incoming light, but larger than one half of the wavelength of the incoming light. At these conditions sometimes referred to as "Bragg conditions", only one diffraction direction, or non-zero diffraction order, is possible. A high efficiency of diffraction in that order can be achieved by properly selecting the diffraction grating period and duty cycle of the grating lines.

Figure 1:
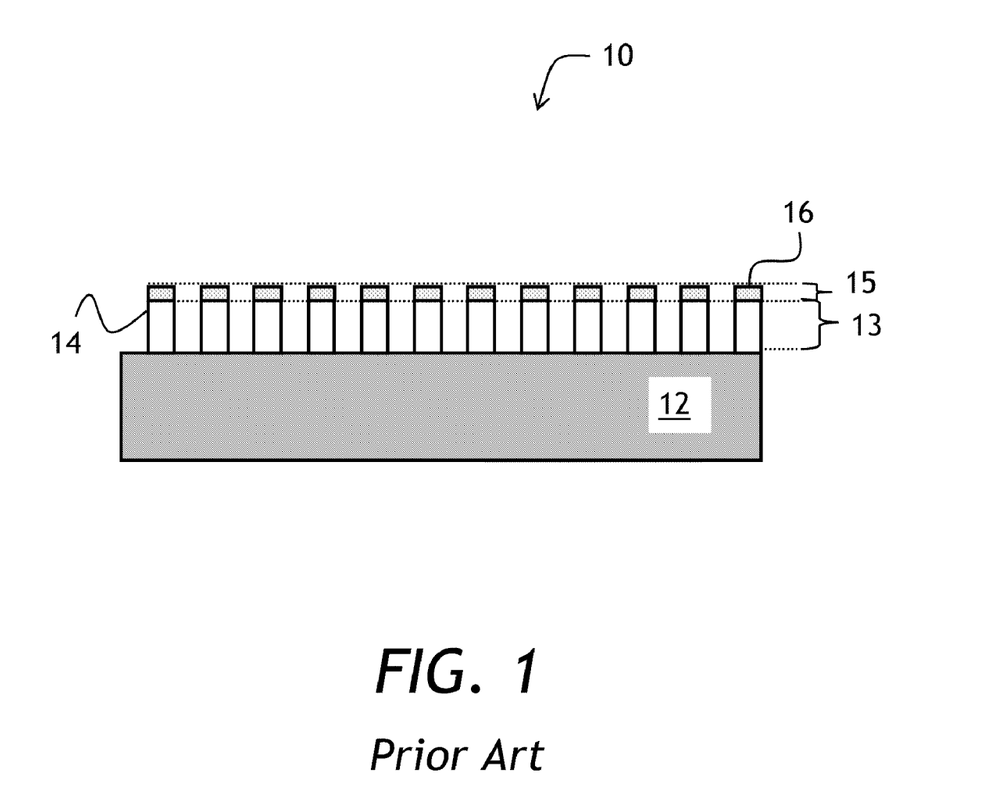
FIG. 1 is a cross-sectional side view of a prior-art surface-relief binary transmission diffraction grating.

Referring to FIG. 1, a prior-art surface-relief bilayer transmission diffraction grating 10 is shown in a cross-sectional view. The grating 10 has a grating layer 13 consisting of grating lines 14 formed on a transparent substrate 12. An antireflective layer 15 consists of antireflective lines 16 formed on top of the grating lines 14. Both the grating lines 14 and the antireflection lines 16 have rectangular cross-sections. In other words, the grating 10 has a so-called binary profile. The rectangular cross-sections are typically achieved by selecting a highly anisotropic etch process for etching through the antireflective layer 15, followed by etching through the grating layer 13 using another highly anisotropic etch process. A diffraction efficiency modeling is used to determine a duty cycle of the grating structure, defined as a ratio of the air gap to the grating period, that gives maximum diffraction efficiency at a given grating line density. For example, to achieve a diffraction efficiency of >90% within a so-called telecommunications C band having a wavelength range of 1.52 to 1.56 microns, a grating structure of FIG. 1 having silicon dioxide ($SiO_2$) antireflective layer 15 and tantalum oxide ($Ta_2O_5$) grating layer 13 should have a grating line density of approximately 900 lines per mm and a duty cycle of about 0.44. A different duty cycle will be required for a different value of grating line density.

Although efficient and reliable, surface-relief transmission diffraction gratings of the prior art have not yet found a widespread use due to their high cost. The high cost is related to the multitude of the process steps used in manufacturing transmission diffraction gratings, as well as to difficulties associated with maintaining high diffraction efficiency and low polarization dependence for different grating batches, as well as across a single grating; the latter is especially true for gratings having large surface area. The manufacturing difficulties result from sensitivity of the diffraction efficiency of the transmission surface relief diffraction gratings to the manufacturing process tolerances. Even at tight tolerances, parameters of the grating lines may vary, which leads to variations of the diffraction efficiency.

It is an object of the present invention to provide a low-cost surface-relief transmission diffraction grating that can be manufactured using a reduced number of process steps. Advantageously, a diffraction grating of the present invention has a high enough diffraction efficiency, so that the requirements for process tolerances can be relaxed, resulting in further cost reduction. It is another object of the present invention to provide a corresponding etch mask parameters selection method and a general manufacturing method of a transmission diffraction grating.

SUMMARY OF THE INVENTION

In accordance with the invention there is provided a diffraction grating for diffracting light, comprising:
a substrate having a top surface;

a plurality of grating lines disposed on the top surface of the substrate, wherein the grating lines run parallel to each other and have a trapezoidal cross-section, each grating line having two sidewalls and a top surface running parallel to the top surface of the substrate; and a plurality of antireflection lines having a substantially rectangular cross-section, wherein each antireflection line is disposed on the top surface of one of the grating lines.

In accordance with another aspect of the invention, the neighboring grating lines of the diffraction grating have clearances therebetween, the substrate having grooves therein, the grooves being disposed in the clearances between the neighboring grating lines.

According to another aspect of the invention, there is provided a surface-relief transmission diffraction grating for diffracting a fraction f of an incoming light into a non-zero diffraction order, the diffraction grating comprising:

a transparent substrate having a top surface, and a patterned bilayer on the top surface of the substrate, the patterned bilayer having an antireflection layer on top of a grating layer, wherein the patterned bilayer has a succession of diffraction grating lines, each line having a cross-section having a substantially rectangular part corresponding to the antireflection layer, on top of a trapezoidal part corresponding to the grating layer;

wherein two parallel sides of the trapezoidal cross-section parts are parallel to the top surface of the substrate;

wherein the diffraction grating lines are disposed periodically with a period D and an air gap C therebetween, and wherein a ratio C/D is such that the fraction f is more than 0.9.

In accordance with another aspect of the invention, there is provided a transmission diffraction grating for diffracting unpolarized light into a non-zero diffraction order, comprising:

a substrate having a top surface;

a plurality of grating lines disposed on the top surface of the substrate and running parallel to each other and to the top surface of the substrate, the grating lines having sidewalls having a non-zero slant angle to the vertical; and a plurality of antireflection lines disposed on the plurality of the grating lines, one antireflection line on top of each grating line, the antireflection lines having sidewalls having a zero slant angle to the vertical;

wherein the slant angle of the of the grating lines is between 1 and 12 degrees, whereby a diffraction efficiency of the diffraction grating is greater than 80%.

According to another aspect of the invention, there is further provided a method for selecting a duty cycle of an etch mask grating usable in manufacturing of the diffraction grating, the method comprising:

(a) selecting a grating material for the grating lines;

(b) selecting an antireflection material for the antireflection lines;

(c) selecting an etching process, including a parameter thereof, for etching through the antireflection material and the grating material;

(d) determining a slant angle between one of the sidewalls of a grating line and the vertical to the substrate, wherein the line is obtainable by etching using the etching process and the etching process parameter selected in step (c), through a first stack consisting of the etch mask grating on top of a layer of the antireflection material selected in step (b) on top of a layer of the grating material selected in step (a);

(e) based on the slant angle determined in step (d), selecting the duty cycle of the etch mask grating, so as to increase a fraction of light diffracted by the diffraction grating manufacturable from the first stack by using the etching process selected in step (c).

In accordance with another aspect of the invention, there is further provided a method for manufacturing a diffraction grating having grooves between the grating lines, the method comprising:

(a) selecting a grating material for the grating lines;

(b) selecting an antireflection material for the antireflection lines;

(c) selecting an etching process and a parameter thereof for etching through the antireflection material and the grating material;

(d) determining a slant angle between one of the sidewalls of a grating line and the vertical to the substrate, wherein the grating line is obtainable by etching using the etching process and the etching process parameter selected in step (c), through a first stack consisting of an etch mask grating on top of a layer of the antireflection material selected in step (b) on top of a layer of the grating material selected in step (a) on top of the substrate;

(e) based on the slant angle determined in step (d), selecting a period and a duty cycle of the etch mask grating, and selecting a depth of etching into the substrate, so as to increase a fraction of light diffracted by the diffraction grating manufacturable from the first stack by etching through the first stack using the etching process selected in step (c);

(f) providing a first stack of step (d) having the etch mask grating having the period and the duty cycle selected in step (e); and (g) using the first stack provided in step (f) to manufacture the diffraction grating by etching the grooves in the substrate to the depth selected in step (e), through the first stack using the etching process selected in step (c), wherein in step (e), thicknesses of the layers of the grating and of the antireflection materials of the first stack are selected to increase a fraction of light diffracted by the diffraction grating.

BRIEF DESCRIPTION OF THE DRAWINGS

Exemplary embodiments will now be described in conjunction with the drawings in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art. In FIGS. 2, 3, 4, and 6, like numerals refer to like elements.

Figure 2:
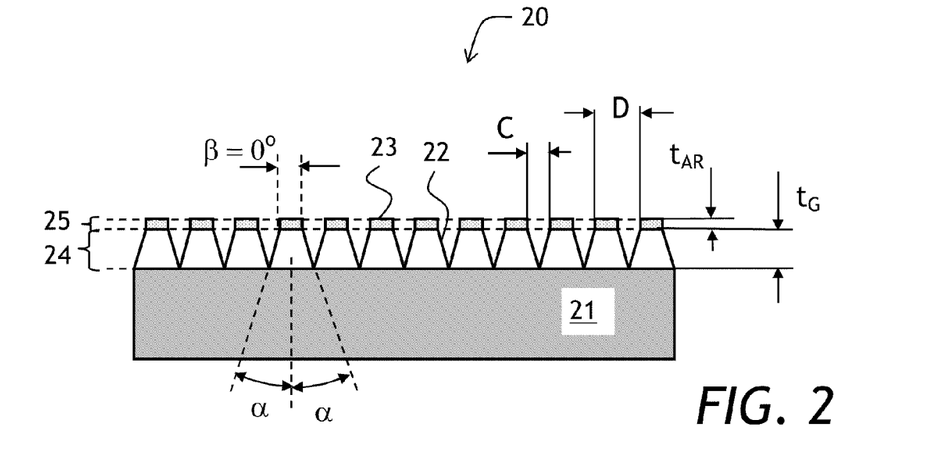
FIG. 2 is a cross-sectional side view of a surface-relief bilayer transmission diffraction grating according to one embodiment of the present invention.

Referring to FIG. 2, a cross section of a surface-relief bilayer transmission diffraction grating 20 of the present invention is shown. The diffraction grating 20 includes a substrate 21, grating lines 22 disposed on a top surface of the substrate 21, and an antireflection line 23 disposed on a top surface of each of the grating lines 22. The grating lines 22 run parallel to each other, but do not necessarily stay straight. The grating lines 22, having the antireflection lines 23 disposed on the top thereof, may curve to include curved sections on the top surface of the substrate 21, similar to a way railroad tracks may turn while running parallel to each other on a land surface. The grating lines 22 have a symmetrical trapezoidal cross-section having a slant angle $\alpha$ from the vertical to the substrate 21 as shown, while the antireflection lines 23 have a rectangular cross section, for which a slant angle $\beta=0$. The top surfaces of the grating and antireflection lines 22 and 23, respectively, run parallel to the top surface of the substrate 21. Preferably, the grating and antireflection lines 22 and 23, respectively, are manufactured by using a single etch mask for etching through a thickness $t_{AR}$ of an antireflection layer 25 and through a thickness $t_G$ of a grating layer 24 through an etch mask, not shown. Using the single etch mask for patterning a "bilayer" consisting of the layers 24 and 25 allows one to reduce manufacturing costs. The etch mask period and opening width determine a period D and line-to-line distance C of the patterned antireflection layer 25.

The trapezoidal shape of the cross-section of the grating lines 22 is a natural consequence of a layer material choice in conjunction with an etching process type and parameters used for etching through the antireflection layer 25 and the grating layer 24. For example, a reactive ion etching (RIE) of silicon dioxide ($SiO_2$) layer 25 on top of tantalum oxide ($Ta_2O_5$) layer 24 yields the slant angle $\alpha$ of a tantalum oxide wall of about 8 degrees, depending on specific process parameters. Normally, a non-zero slant angle $\alpha$ is considered a process related error in manufacturing of a binary grating profile and is therefore undesirable. In contradistinction with this traditional standpoint and according to the present invention, the process-dependent slant angles $\alpha$ and $\beta$ are taken into account when optimizing the diffraction grating optical performance. The slant angle $\beta$ is zero for silicon dioxide ($SiO_2$) antireflection lines 23; and the slant angle $\alpha$ is determined before determining the period D and the line-to-line distance, or air gap C. Once the slant angle $\alpha$ obtainable at a single-step etching of the antireflection and grating layers 25 and 24, respectively, is determined, the diffraction efficiency modeling is used to determine a duty cycle, that is, C/D ratio, of the grating structure 20. Surprisingly, the maximum diffraction efficiency, defined as a fraction of unpolarized light diffracted by the diffraction grating 20, is in this case over 90%, despite the fact that the sidewalls of the grating lines 22 are slanted and not straight. Furthermore, the diffraction efficiency does not decrease at a non-zero value of the slant angle $\alpha$, as compared to the abovementioned case of perfectly straight walls of the transmission diffraction grating 10. Accordingly, a single etch mask for etching through a stack of the grating layer 24 and the antireflection layer 25 can be used in a simplified process, whereby substantial equipment and process related cost savings are achievable without any degradation whatsoever of the diffraction efficiency of the diffraction grating 20. Results of diffraction efficiency modeling that confirm this important finding are presented in FIG. 5 discussed below.

Figure 3:
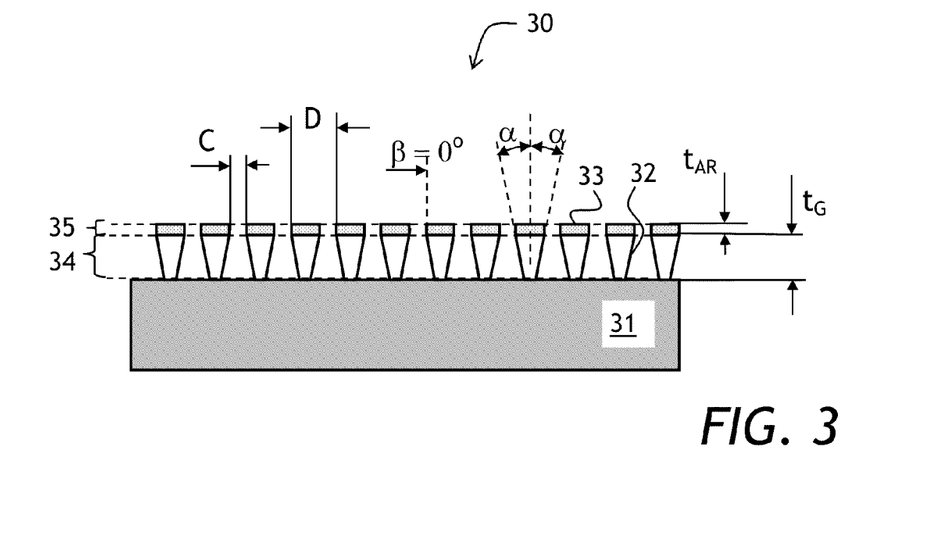
FIG. 3 is a cross-sectional side view of a surface-relief bilayer transmission diffraction grating having a negative slant angle of a grating line sidewall.

A diffraction grating structure of the present invention obtainable by using a method of manufacture of the present invention is not limited to slant angles of the grating lines 22 shown in FIG. 2. Turning now to FIG. 3, a cross section of a surface-relief bilayer transmission diffraction grating 30 is shown having the substrate 31, grating lines 32 etched from a grating layer 34, disposed on a top surface of the substrate 31, and antireflection lines 33 etched from an antireflection layer 35, disposed on the top surface of the grating lines 32. The diffraction grating 30 differs from the diffraction grating 20 in that the grating lines 32 have a "negative" sidewall slant angle, that is, the trapezoidal cross-section of the grating lines 32 is wider at a top than it is at a bottom of the grating layer 34. An etching method that results in an undercut can be used to arrive at the shape of the diffraction grating lines 32.

Figure 4:
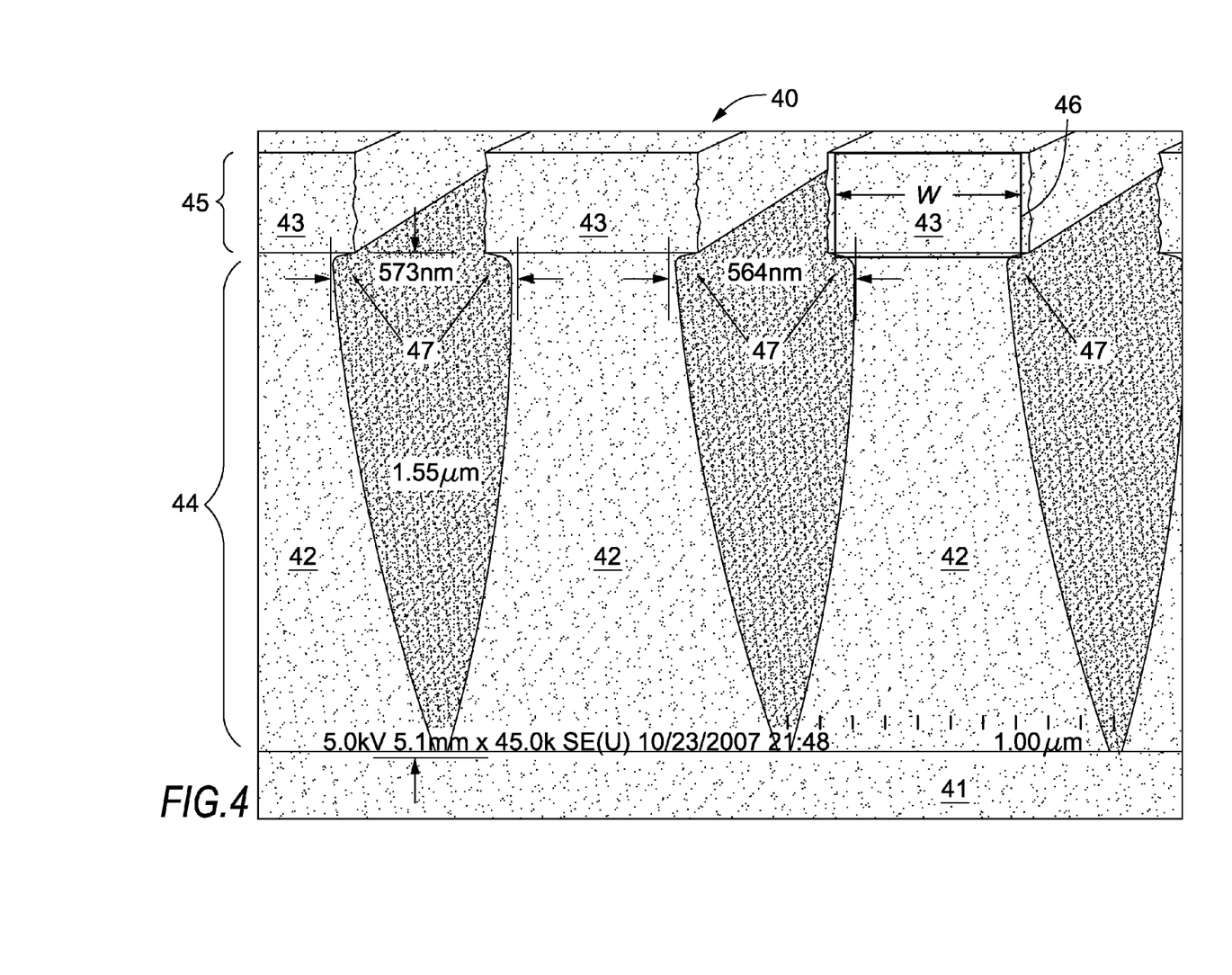
FIG. 4 is a scanning electron microscope microphotograph showing a cross-section of a manufactured diffraction grating of the present invention.

Referring now to FIG. 4, a scanning electron microscope (SEM) microphotograph of a diced and polished side surface of a transmission grating sample 40 is presented. The sample 40 corresponds to the grating 20 of FIG. 2. The sample 40 was manufactured using an inductive-coupled plasma (ICP) RIE process to etch through an $SiO_2$ antireflection layer 45 on top of a $Ta_2O_5$ grating layer 44. The sample 40 has $SiO_2$ antireflection lines 43 on top of $Ta_2O_5$ grating lines 42 on a $SiO_2$ substrate 41. The grating lines 42 are about 1.55 microns high and have a roughly trapezoidal, symmetrical cross-section, with a slight curvature of the sidewalls. For clarity, the term "trapezoidal cross-section" used herein includes this slight curvature of the sidewalls.

The antireflection lines 43 have a substantially rectangular cross-section. Herein, the term "substantially rectangular" means that, as is seen in FIG. 4, the sidewalls of the antireflection lines 43 can be slightly rugged, e.g. within 10% of a width W of the lines 43, and randomly deviate from an ideal rectangular perimeter shown at 46. The roughness of sidewalls of the antireflection lines 43 results from a particular etching process used. The measured gaps between the grating lines 42 are 564 nm and 573 nm. A slight undercut of the $SiO_2$ antireflection lines 43 is observed at 47, in which the width of the top end of the grating lines 42 is less than the width of the bottom end of the antireflection lines 43, forming a shoulder therebetween.

Figure 5:
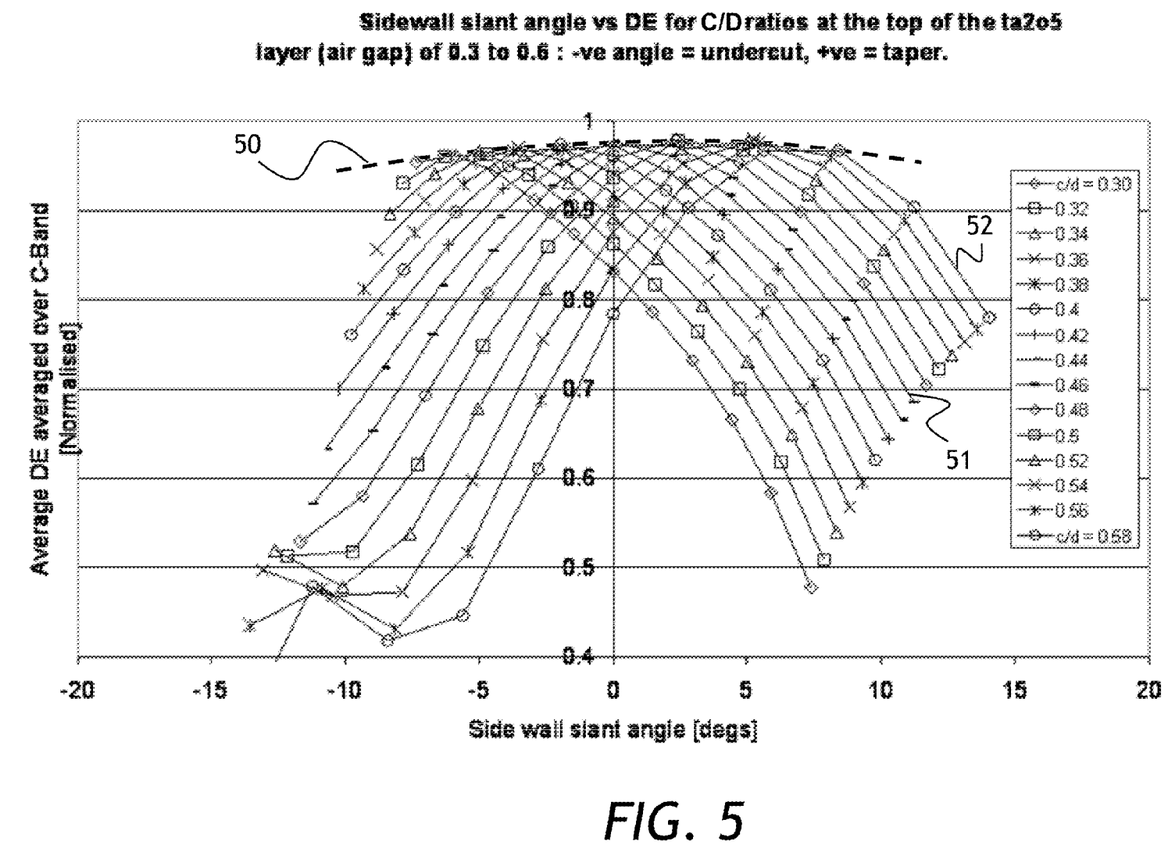
FIG. 5 is a graph indicating a relationship between the calculated diffraction efficiency and a grating line sidewall slant angle at a plurality of diffraction grating duty cycles.

Turning to FIG. 5, a relationship between a calculated diffraction efficiency and a grating line sidewall slant angle $\alpha$ is presented. Each curve in FIG. 5 represents a dependence of the averaged diffraction efficiency over C band on the slant angle $\alpha$ at a particular value of the grating duty cycle C/D. The following assumptions were used in the calculations: the antireflection layer 25, 35 or 45 is a 0.27 um thick $SiO_2$ layer; the grating layer 22, 32 or 42 is a 1.2 um thick $Ta_2O_5$ layer; $\beta=0$. The vertical axis denotes diffraction efficiency, and the horizontal axis denotes the slant angle $\alpha$ of a grating line sidewall. The positive slant angle $\alpha$ corresponds to the diffraction grating 20 of FIG. 2, and the negative slant angle α corresponds to the diffraction grating 30 of FIG. 3. The zero slant angle α corresponds to the case of an ideal binary grating.

A curve 51 at C/D=0.44 peaks at the slant angle α of zero degrees. This is the case considered earlier, during discussion of FIG. 1. One can see from FIG. 5 that, for a given duty cycle C/D in the range of about 0.3 to 0.6, a maximum diffraction efficiency is achieved at a certain sidewall slant angle α. For a given slant angle α that can be pre-determined by the manufacturing process, a duty cycle exists that corresponds to a maximum diffraction efficiency. It has been discovered that the "envelope" diffraction efficiency, shown by a dashed line 50 in FIG. 5, peaks at about the slant angle α of 6 degrees, which is, fortunately, close to the value of α=8 degrees observed in the sample 40 of FIG. 4, manufactured with an ICP RIE process. Therefore, for a process-dependent slant angle α, which is about 8 degrees for the process used to manufacture the sample 40 of FIG. 4, a duty cycle value exists that allows a further increase of the overall diffraction efficiency as compared to the diffraction efficiency obtainable for the prior-art case of straight walls, that is, when the walls have a slant angle α of zero degrees. Perhaps more important than this slight increase of the diffraction efficiency is the fact that the slant angle α of 8 degrees of the grating lines 42 and substantially zero slant angles β of the antireflection lines 43 are inherent angles of the etch process used to etch through both the grating and antireflection layers 44 and 45, respectively, and, therefore, when a proper duty cycle C/D is selected, a single etch mask and an associated etch procedure may be used to manufacture a high-efficiency bilayer diffraction grating. By taking into account the grating and antireflection slant angle values of α and β during the diffraction efficiency optimization, a duty cycle C/D can be found that results in maximum diffraction efficiency. For example, for the slant angle α of 8 degrees in FIG. 5, the duty cycle of 0.58 maximizes the diffraction efficiency as is evidenced by a curve 52 in FIG. 5. This duty cycle can be obtained by etching through an etch mask having an appropriately selected duty cycle that takes into account lateral etching properties of a particular etch process. For example, during ICP RIE etching, a lateral etching occurs that increases the C/D ratio by about 75%. This lateral etching property has to be taken into account when selecting the duty cycle of the etch mask, which has to have the duty cycle that is smaller than the duty cycle of the diffraction grating by 75%. Unexpectedly and advantageously, the lateral etching property of the ICP RIE process facilitates manufacturing of diffraction gratings with line frequency of up to 1100 lines per millimeter, having the C/D value of more than 0.5. Unpolarized light diffraction efficiency of over 80% is easily achievable at slant angle α of 1 to 12 degrees.

Figure 6:
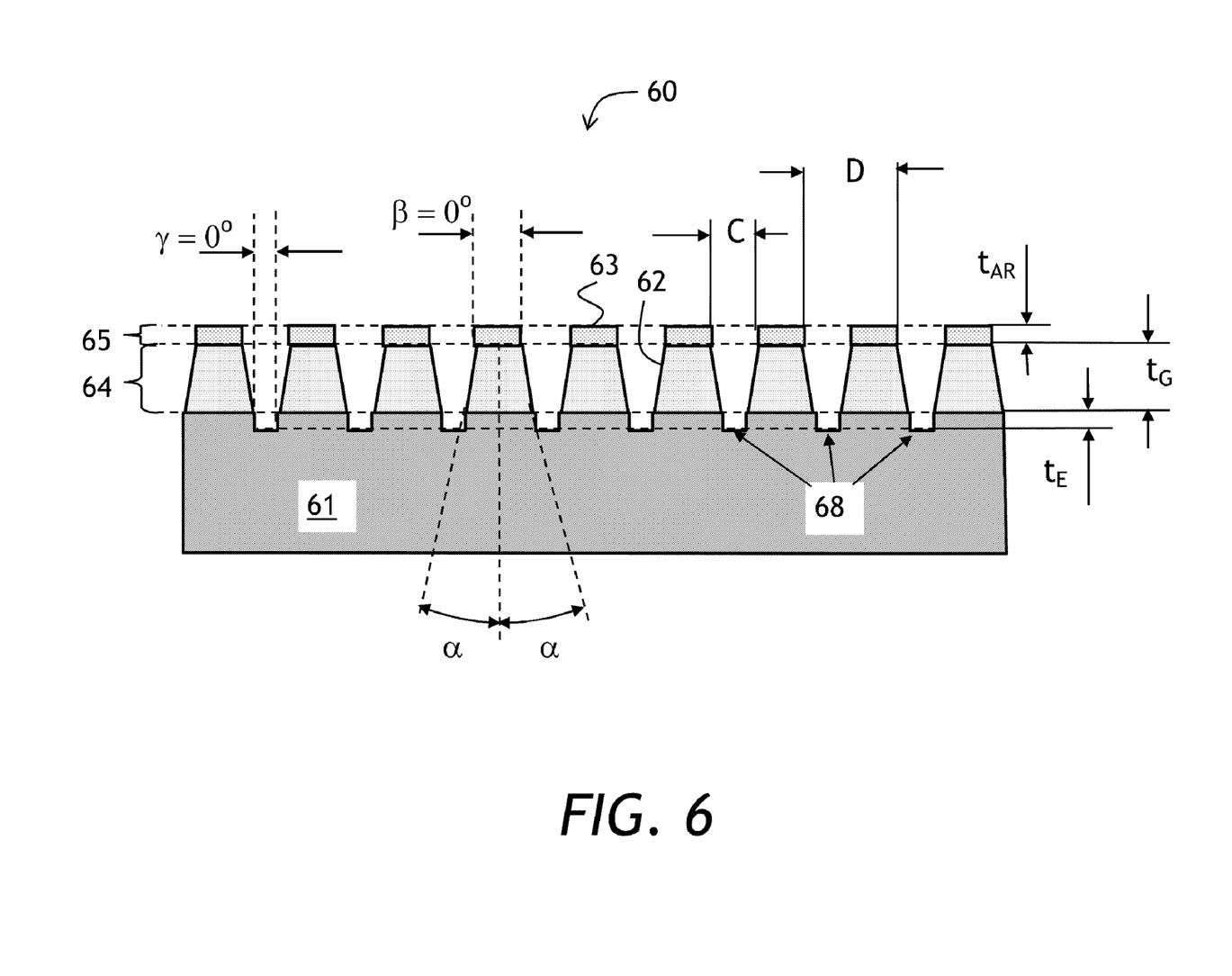
FIG. 6 is a cross-sectional side view of a surface-relief bilayer transmission diffraction grating having grooves in the substrate.

Further, omitting an etch stop layer between the grating layer and the substrate, resulting in over-etching the grating layer, was found to further improve the diffraction efficiency of the grating and its polarization performance. Referring now to FIG. 6, a cross-sectional side view of such an "over-etched" surface-relief bilayer transmission diffraction grating 60 is shown. The diffraction grating 60 includes a substrate 61, grating lines 62 on a top surface of the substrate 61, and antireflection lines 63 on top of the grating lines 62. The grating lines 62 have trapezoidal cross-sections and non-zero slant angles α of the sidewalls. The antireflection lines 62 have zero slant angles β. The substrate 61 has grooves 68 etched in gaps between the grating lines 62. The grooves 68 are etched to a depth of $t_E$, of preferably 50 to 250 nm, during the same process of etching through antireflection and grating layers 65 and 64, respectively, to form the antireflection and grating lines 63 and 62, respectively. The grooves 68 have zero slant angles γ as shown. Preferably, the grating layer 64 is a $Ta_2O_5$ layer, the antireflection layer 65 is a $SiO_2$ layer, and the substrate 61 is a $SiO_2$ substrate. Since the material of the substrate 61 and of the antireflection layer 65 is the same, the angles β and γ tend to be the same, specifically zero in this case, when the same etching materials used to form the antireflection lines 63 and the grooves 68, of the diffraction grating 60.

Figure 7:
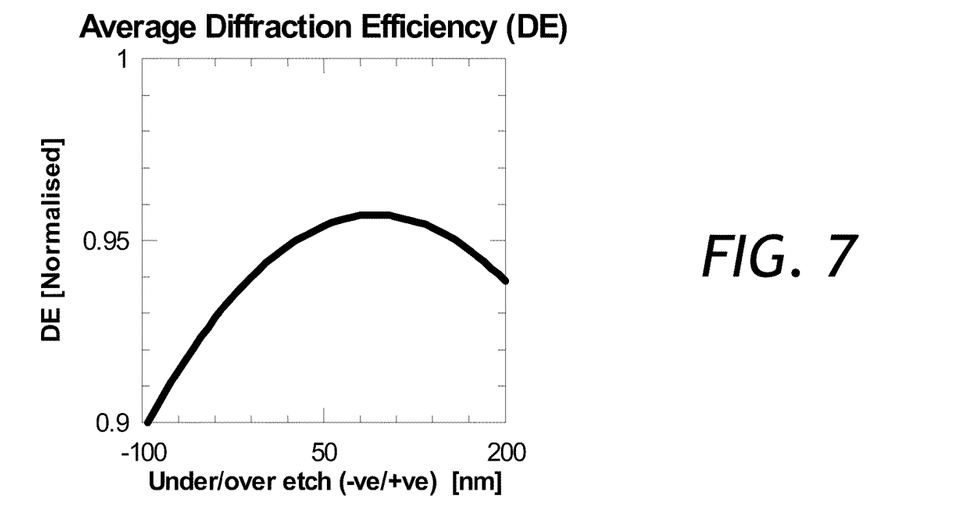
FIG. 7 is a graph indicating a relationship between calculated diffraction efficiency of a diffraction grating of FIG. 6 and the groove depth.
Figure 8:
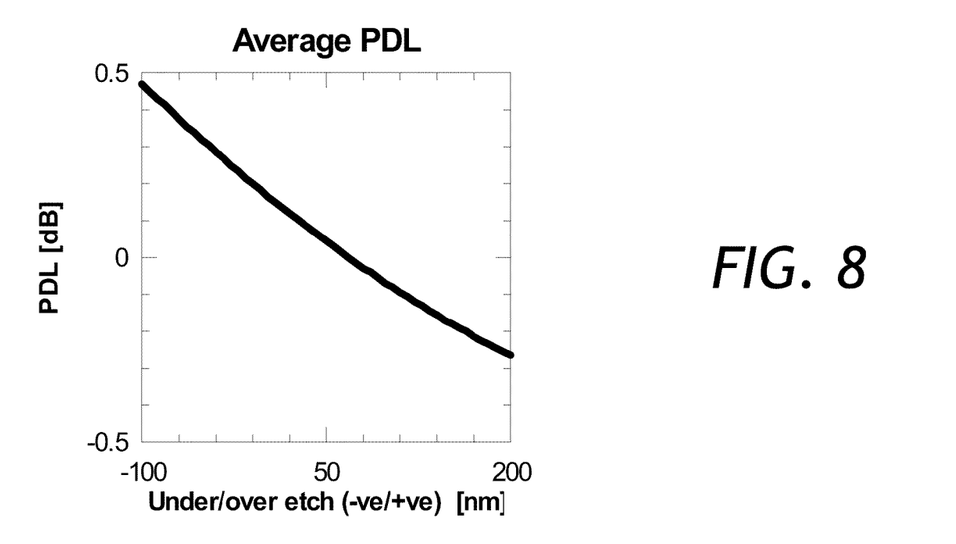
FIG. 8 is a graph indicating a relationship between calculated polarization dependent loss (PDL) of a diffraction grating of FIG. 6 and the groove depth.

Turning to FIG. 7, a relationship between a calculated diffraction efficiency of a diffraction grating 60 of FIG. 6 and the groove depth $t_E$ is presented. In FIG. 7, the negative values on the horizontal axis correspond to an under-etch, when there are no grooves 68 and the trapezoidal cross-sections of the grating lines 62 touch each other at the top surface of the substrate 61, and the positive values on the horizontal axis correspond to an over-etch, when the grooves 68 are formed in the substrate 61 in gaps between the neighboring grating lines 62. One can see from FIG. 7 that at an over-etch $t_E$ of 60 nm to 70 nm, the diffraction efficiency increases by an additional 6%. Similarly, referring to FIG. 8, a relationship between a calculated polarization dependent loss (PDL), defined as a polarization dependence of the diffraction efficiency, of a diffraction grating 60 of FIG. 6 and the groove depth $t_E$ has a "sweet spot" at $t_E$ of about 50 nm. Advantageously, the diffraction grating 60 achieves a high diffraction efficiency and low PDL, less than 0.5 dB, at almost the same depth $t_E$ of the grooves 68.

Figure 9:
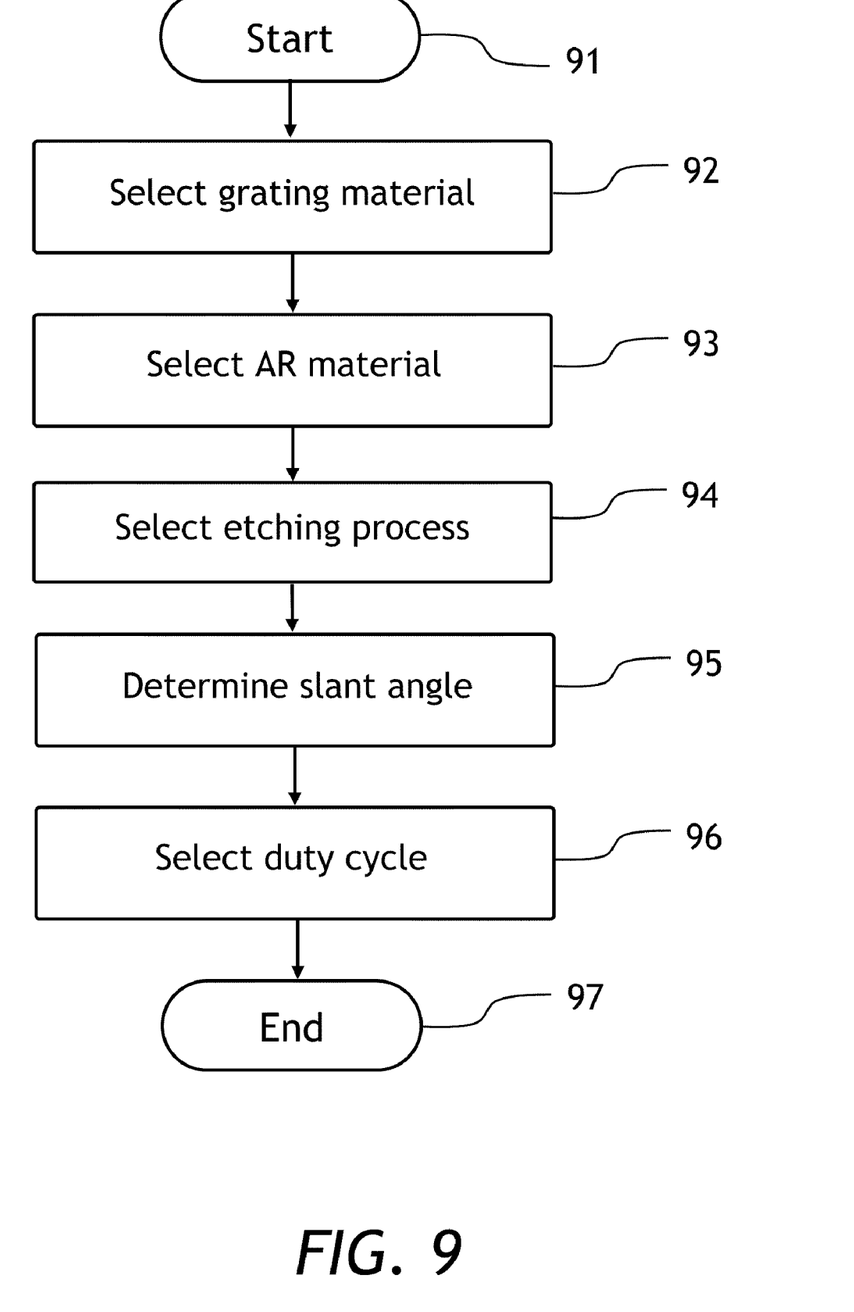
FIG. 9 is a flow chart for a method of selecting a duty cycle of an etch mask grating usable in manufacturing of a diffraction grating of the present invention.

Exemplary methods of manufacturing of the diffraction grating 20, 30, 40, or 60, and in particular methods of selecting duty cycle of an etch mask, will now be described in more detail. Turning to FIG. 9, a flow chart for a method of selecting a duty cycle C/D of an etch mask grating used in manufacturing of diffraction gratings 20, 30, 40, or 60 is presented. The procedure starts at a step 91. At a step 92, a material for a grating layer, e.g. 24, 34, 44, is selected. At a step 93, a material for an antireflection (AR) layer, e.g. 25, 35, 45, is selected. The steps 92 and 93 may be interchanged. At a step 94, the etching process, including etching method, etching materials, process parameters, etc., is selected. At a step 95, the corresponding slant angle α is determined, preferably by providing a test stack of the grating and antireflection layers selected at the steps 92 and 93, etching the stack, and measuring the resulting slant angle. At a step 96, the determined slant angle is used for modeling and optimizing the diffraction grating performance. The modeling is performed using a suitable electromagnetic model of diffraction by a transmission diffraction grating, available in the art. The goal of the modeling at the step 96 is to provide a duty cycle of the diffraction grating, C/D, that results in the highest diffraction efficiency and, optionally, the lowest PDL. In practice, the diffraction efficiency of over 90% is highly desirable, but the diffraction efficiency of over 80% and/or PDL of less than 0.5 dB are often sufficient. Reducing PDL can lead to an additional increase of the diffraction efficiency, e.g. from 80% to 85%. From the duty cycle C/D, the duty cycle of the etch mask is determined based on a know parameter of an over-etch, e.g. 75% increase of the duty cycle is accounted for as has been explained above. The procedure ends at a step 97.

Once the duty cycle of the etch mask is determined, the diffraction grating can be manufactured by providing a stack of the materials selected at the steps 92 and 93, and etching the stack using the method and the process parameters selected at the step 94.

Figure 10:
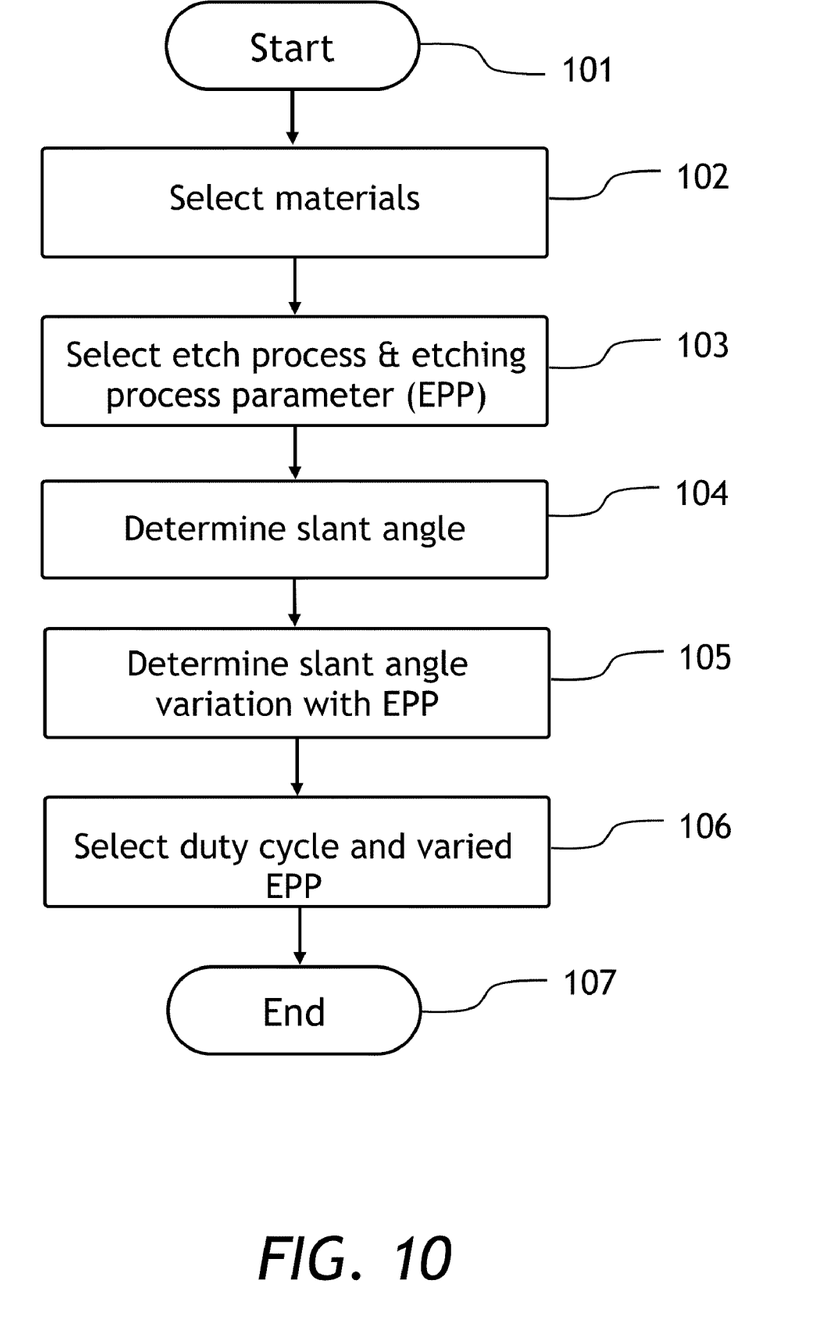
FIG. 10 is a flow chart of an alternative method of selecting a duty cycle of an etch mask grating usable in manufacturing of a diffraction grating of the present invention.

Referring now to FIG. 10, an alternative method of selecting a duty cycle of an etch mask grating usable in manufacturing of the diffraction grating 20, 30, 40, or 60, is presented by means of a flow chart. The method starts at a step 101. At a step 102, materials of the grating and antireflection layers of the grating are selected. At a step 103, the etching process, including etching method, etching materials, an etch process parameter (EPP), etc., is selected. At a step 104, the corresponding slant angle is determined. At a step 105, a dependence of slant angle variation on the EPP variation is determined. The slant angle parameter and its variation function are preferably determined in a series of experiments. Further, at a step 106, optical modeling is performed. At the step 106, the slant angle is also varied, to maximize the diffraction efficiency, and the proper duty cycle of the etch mask is found in the same way it was done in the process of FIG. 9. At a step 107, the procedure ends. The value of a "sweet spot" slant angle resulting in maximum diffraction efficiency can be translated, through the dependence found in the step 105, into a corresponding value of the EPP variation. Then, the diffraction grating is manufactured by providing a stack of the materials selected in the step 102, and etching the stack using the etching process and the process parameters selected in the step 103, with the varied EPP determined in the step 106.

The experimental determination of the slant angle and its variation with process parameter(s) is preferably done by: (a) providing the grating stack; (b) etching through the grating stack; and (c) measuring the slant angle of a grating line sidewall using, for example, SEM microscopy.

The methods of FIGS. 9 and 10 can be extended to account for undercut of the antireflection lines, e.g. the undercut 47 of the lines 43 seen in FIG. 4. The undercut 47 is accounted for at the steps 96 and 106, by introducing an undercut parameter defined as a fraction of the width W of the antireflection lines 43 in FIG. 4, and modeling the undercut 47 in the optical model. Further, thicknesses of the antireflection and the grating layers 45 and 44, respectively, can be either optimized or pre-selected to arrive at a maximum diffraction efficiency. Furthermore, for the diffraction grating 60 of FIG. 6, having grooves 68 in the substrate 61, the depth of the grooves 68 in the substrate 61 is preferably optimized at the steps 96 or 106, to provide maximum diffraction efficiency and reduced PDL.

A skilled artisan will realize that exemplary embodiments of the invention presented above may be expanded upon without departing from the invention. For example, layer materials can be substituted and, or additional layers may be introduced, e.g. an antireflective layer on the opposite side of the substrate may be introduced to improve optical throughput. It is these many combinations of features and aspects of the present invention that should lead one to realize that the concept is broader than the embodiments and method steps disclosed herein. For this reason one is cautioned not to limit the invention to the disclosed embodiments, but rather encouraged to determine the scope of the invention only with reference to the following claims.

What is claimed is:

1. A diffraction grating for diffracting light, comprising:
   a substrate having a top surface;
   a plurality of grating lines disposed on the top surface of the substrate,
      wherein the grating lines run parallel to each other and have a trapezoidal cross-section, each grating line having two sidewalls and a top surface running parallel to the top surface of the substrate; and
   a plurality of antireflection lines having a substantially rectangular cross-section,
      wherein each antireflection line is disposed on the top surface of one of the grating lines.

2. A diffraction grating of claim 1, wherein a width of the trapezoidal cross-sections at the top surfaces of the grating lines is less than a width of the substantially rectangular cross-sections of the antireflection lines disposed on the top of the corresponding grating lines.

3. A diffraction grating of claim 1, wherein a width of the trapezoidal cross-sections at the top surfaces of the grating lines is more than a width of the trapezoidal cross-sections at the top surface of the substrate.

4. A diffraction grating of claim 3, wherein the sidewalls of the grating lines are slanted at an angle of between 1 and 7 degrees from the vertical to the substrate.

5. A diffraction grating of claim 1, wherein a width of the trapezoidal cross-sections at the top surfaces of the grating lines is less than a width of the trapezoidal cross-sections at the top surface of the substrate.

6. A diffraction grating of claim 5, wherein the sidewalls of the grating lines are slanted at an angle of between 1 and 12 degrees from the vertical to the substrate.

7. A diffraction grating of claim 1, wherein the trapezoidal cross-sections of the neighboring grating lines contact or overlap each other at the top surface of the substrate.

8. A diffraction grating of claim 1, wherein neighboring grating lines have clearances therebetween.

9. A diffraction grating of claim 8, wherein the substrate has grooves therein, and wherein the grooves are disposed in the clearances between the neighboring grating lines.

10. A diffraction grating of claim 9, wherein the grooves in the substrate have a substantially rectangular cross-section.

11. A diffraction grating of claim 10, wherein the grooves in the substrate have a depth of between 10 nm and 250 nm.

12. A diffraction grating of claim 1,
    wherein the grating lines are disposed on the top surface of the substrate with a period D;
    wherein neighboring grating lines have clearances C at the top surfaces thereof; and
    wherein the ratio C/D is more than 0.3 but less than 0.6.

13. A diffraction grating of claim 12, wherein the C/D ratio is such that a fraction of incoming light diffracted by the diffraction grating into a non-zero diffraction order exceeds 90%.

14. A diffraction grating of claim 1, wherein the grating lines are composed of $Ta_2O_5$, and the antireflection lines are composed of $SiO_2$.

15. A surface-relief transmission diffraction grating for diffracting a fraction f of an incoming light into a non-zero diffraction order, the diffraction grating comprising:
    a transparent substrate having a top surface; and
    a patterned bilayer on the top surface of the substrate, the patterned bilayer having an antireflection layer on top of a grating layer,
       wherein the patterned bilayer has a succession of diffraction grating lines, each line having a cross-section having a substantially rectangular part corresponding to the antireflection layer, on top of a trapezoidal part corresponding to the grating layer;
    wherein two parallel sides of the trapezoidal cross-section parts are parallel to the top surface of the substrate;
    wherein the diffraction grating lines are disposed periodically with a period D and an air gap C therebetween, and wherein a ratio C/D is such that the fraction f is more than 0.9.

16. A diffraction grating of claim 15, wherein the ratio C/D is more than 0.3 but less than 0.6.

17. A diffraction grating of claim 15, wherein the transparent substrate has grooves therein, the grooves being disposed between the diffraction grating lines of the patterned bilayer, whereby the fraction f has a polarization dependent variation of less than 0.5 dB.

18. A transmission diffraction grating for diffracting unpolarized light into a non-zero diffraction order, comprising:
- a substrate having a top surface;
- a plurality of grating lines disposed on the top surface of the substrate and running parallel to each other and to the top surface of the substrate, the grating lines having sidewalls having a non-zero slant angle to the vertical; and
- a plurality of antireflection lines disposed on the plurality of the grating lines, one antireflection line on top of each grating line, the antireflection lines having sidewalls having a zero slant angle to the vertical;
- wherein the slant angle of the of the grating lines is between 1 and 12 degrees, whereby a diffraction efficiency of the diffraction grating is greater than 80%.

19. A transmission diffraction grating of claim 18, wherein the substrate has grooves between neighboring grating lines, whereby the diffraction efficiency is greater than 85%.

20. A transmission diffraction grating of claim 19, wherein the grooves have a rectangular cross-section.

* * * * *